Oct. 21, 1941.  S. NOVE  2,259,770
RECEPTACLE COVER
Filed Nov. 5, 1940
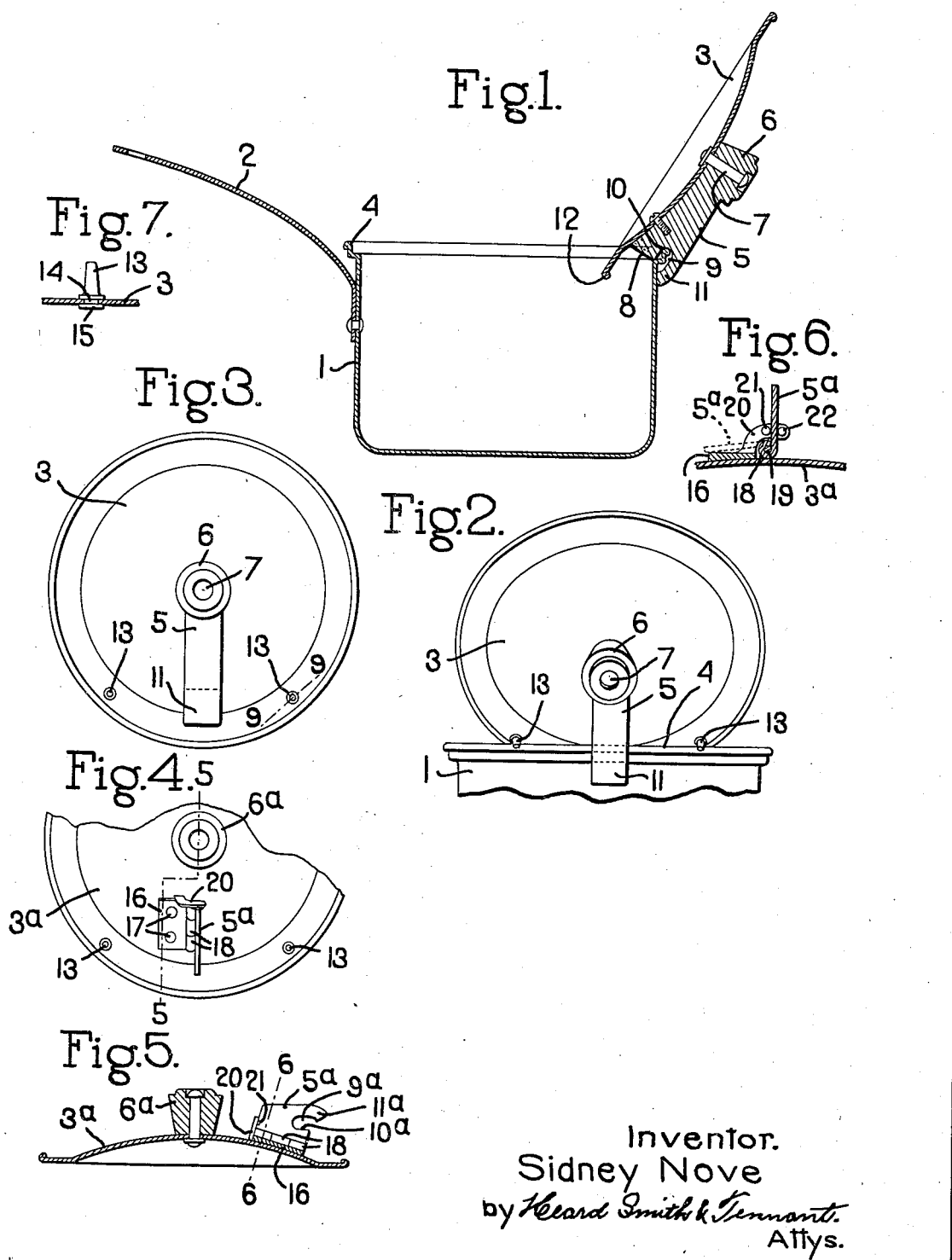

Patented Oct. 21, 1941

2,259,770

UNITED STATES PATENT OFFICE 2,259,770

RECEPTACLE COVER

Sidney Nove, Winchendon, Mass.

Application November 5, 1940, Serial No. 364,368

4 Claims. (Cl. 53—8)

This invention relates to covers for receptacles or containers and particularly to covers for pots, kettles and other cooking utensils, although the invention is capable of use in connection with covers for receptacles used for other purposes than cooking. One of the objects of the invention is to provide a novel cover for a cooking utensil which, when lifted from the utensil for an inspection of the food being cooked therein, or for the removal of the food therefrom, may be supported on one edge of the receptacle in an inclined position with the lower edge of the cover within the confines of the top edge of the utensil so that any condensed steam grease or other liquid which adheres to the under face of the cover will drain back into the utensil.

In order to give an understanding of the invention, I have shown it as it might be applied to a cover for a pot or kettle, but, as stated above, the invention is also adapted for use in connection with covers for other receptacles.

In the drawing:

Fig. 1 is a sectional view through a cooking utensil showing my improved cover supported on the edge of the utensil in position so that any liquid adhering to the under face of the cover will drain back into the utensil.

Fig. 2 is a fragmentary side view of Fig. 1.

Fig. 3 is a view of the cover.

Fig. 4 is a fragmentary view of a cover showing a different embodiment of the invention.

Fig. 5 is a sectional view through a cover such as illustrated in Fig. 4, the section being taken on the line 5—5, Fig. 4.

Fig. 6 is an enlarged section on the line 6—6, Fig. 5.

Fig. 7 is a section on the line 9—9, Fig. 3.

In the drawing, I indicates a pot or kettle, such as is commonly used for cooking purposes and which is provided with a handle 2 of any appropriate construction. The cover for the pot I is indicated generally at 3. In applying my invention to the cover, the latter is provided on its outer face with a supporting member which is formed with a seat portion adapted to rest on the top edge 4 of the pot I and with a brace arm which extends over the top edge and is adapted to engage the outer wall of the pot below the top edge, said seat and brace serving to hold the cover supported on the edge 4 of the pot in an inclined position shown in Fig. 1, and with the lower edge of the cover located within the confines of said top edge of the pot I so that any water, grease or other liquid adhering to the under side of the cover will drain back into the pot.

In the construction shown in Figs. 1, 2 and 3, this supporting member is made integral with the knob, said supporting member and knob forming together a handle by which the cover may be manipulated. The supporting member is indicated at 5, and the knob portion thereof is indicated at 6, the latter being situated centrally of the cover and being secured to the cover in any suitable way, as by means of the rivet 7. The body of the supporting portion 5 extends laterally from the knob portion 6 toward the periphery of the cover, but terminates short of the periphery. The outer end 8 of the supporting member is formed with a notch 9 of a size to receive the edge 4 of the utensil I. The inner wall 10 of the notch constitutes a seat portion which is adapted to rest on said upper edge 4, and the portion 11 on the outer side of the notch forms a brace arm which is adapted to extend over the edge 4 and to rest against the outside of the pot I at a point below the edge 4.

When the cover is in closed position on the pot I, it functions as any cover does, and it will be understood that during the cooking operation condensed steam, grease, or other similar material will accumulate on the under face of the cover.

When the cover is to be removed to inspect the food cooking in the pot or for the purpose of removing food therefrom, said cover will be placed on the edge of the pot, as shown in Fig. 1 with the edge occupying the notch 9 and with the seat portion 10 resting on the edge of the pot, and with the brace arm 11 engaging the outer wall of the pot. When in this position, the lower edge 12 of the cover lies within the confines of the top edge 4 of the pot and dips slightly into the pot, so that any liquid draining from the underside of the cover will drip back into the pot.

While a supporting member such as above described will support the edge of the cover in an inclined position, especially if the pot and cover are relatively small, yet, if desired, I may employ additional supports for the cover in the form of two projections 13 which are situated adjacent the peripheral edge of the cover, one on each side of the supporting member 5 and spaced a suitable distance therefrom. These projections 13 engage the top edge 4 of the pot, as shown in Fig. 2, and thus there is provided a three-point support for the cover which will prevent it from tipping sideways about the supporting member 5 as a fulcrum. The legs or projections 13 are of special advantage in the case of large covers.

Such projections 13 may be formed in any approved way without departing from the invention. In the construction shown, they are in the form of studs provided with stems 14 that extend through the cover 3 and are headed over on the under side of the cover, as indicated at 15 in Fig. 9.

In Figs. 4, 5 and 6, I have shown an embodiment of the invention in which the supporting member is separate from the knob for the cover and is hingedly connected to the cover so that it can be folded down against the cover when it is not in use, or may be swung up into the operative position. In said figures, the cover is indicated at 3a, and it is provided with the usual knob 6a. The supporting member is indicated at 5a, and it is illustrated as being made of sheet metal and is hinged to the cover so that it can be folded down against the cover, as shown in dotted lines, Fig. 6, or may be swung into an operative position at right angles to the cover, as shown in full lines in Fig. 6 and Fig. 5. This supporting member 5a is formed in its outer edge with a notch 9a, one wall 10a of which constitutes a seat portion to rest on the upper edge 4 of the pot, and the part 11a on the outer side of the notch forms the brace arm adapted to extend over the upper edge 4 of the pot and engage the outer wall thereof below said edge. This supporting member may be hinged to the cover 3a in any approved way without departing from the invention. In the construction shown, said member 5a is hingedly connected to a base member or anchoring member 16 which overlies the outer face of the cover 3a and is secured thereto by rivets 17 or in any other appropriate way. The member 5a and the anchoring member 16 are formed on their adjacent edges with interleaved loops 18 through which a pintle pin 19 extends thereby hingedly connecting the two members together.

Means are provided for retaining the supporting member 5a in its upright operative position, and for this purpose the base 16 is provided with an upstanding resilient arm 20 located at the inner edge of the member 5a, said arm being provided with two protuberances 21, 22, between which the edge of the supporting member 5a is received when the latter is in its operative position.

The protuberance 21 is relatively small, and the resiliency of the arm 20 is sufficient so that when the supporting member 5a is swung into or out of its operative position, the arm 20 will yield sufficiently to allow the edge of the supporting member to wipe by the protuberance 21.

It will be observed that in all embodiments of my invention, the means for supporting the cover is located entirely on the cover, and is such that a cover embodying my invention can be used with any pot or kettle. Hence, the use of my invention does not involve any special construction of pot or kettle and involves only the application to the cover of the supporting member in some appropriate form.

I claim:

1. A cover for pots, kettles and other receptacles having means for supporting it in an inclined position on the upper edge of the receptacle, said means comprising two spaced projections extending outwardly from the outer face of the cover adjacent its edge and adapted to rest against the top edge of the receptacle, and a supporting member secured to the outer face of the cover and presenting a seat portion to rest against the inside of the receptacle at its upper edge at a point between the points where said projections engage the upper edge, and a brace portion extending over the upper edge of the receptacle and engaging the outside thereof below said upper edge, said projections and seat portion constituting a three-point support for the cover.

2. A cover for pots, kettles, and other receptacles having means for supporting it in an inclined position on the edge of the receptacle, said means comprising two spaced projections extending outwardly from the outer face of the cover adjacent its edge and adapted to rest against the top edge of the receptacle, and a supporting member hinged to the outside of the cover and presenting a seat portion to rest against the inside of the receptacle at its upper edge between the points where said upper edge is engaged by the projections and also having a brace portion which extends over the upper edge and engages the outside of the receptacle, the hinge connection permitting the supporting member to be folded against the cover when it is not in use.

3. A cover for pots, kettles and other receptacles, comprising a cover member having a knob provided with a radial extension extending well toward the edge of the cover and formed in its outer end with a recess of a size to freely receive the edge of the pot, the inner wall of the recess constituting a seat portion to rest on the edge of the pot and the outer wall portion of the recess extending beyond the inner wall portion thereof and constituting a rigid brace arm to engage the outside of the pot at a point below the upper edge, said cover having two outwardly directed projections extending therefrom adjacent its edge at widely spaced points, one projection being situated on each side of the knob extension, said projections adapted to rest on the top edge of the pot and forming with the seat portion a three-point support for the cover on said pot.

4. A cover for pots, kettles and other receptacles having means for supporting it in an inclined position on the upper edge of the receptacle, said means comprising a supporting member secured to the outer face of the cover and presenting a seat portion to rest against the upper edge of the receptacle and a brace portion extending over said upper edge and engaging the outside of the receptacle below said edge, and means projecting from the outer face of the cover adjacent its edge and at a distance from the supporting member, which means is adapted to rest on the edge of the receptacle at a distance from the point where the supporting member engages said edge.

SIDNEY NOVE.